United States Patent [19]

Kennedy et al.

[11] Patent Number: 4,574,452

[45] Date of Patent: Mar. 11, 1986

[54] METHOD OF FASTENING METERED JOINTS OF A WOODEN PICTURE FRAME

[75] Inventors: Gary D. Kennedy; Joseph G. Maher, both of Atlanta, Ga.

[73] Assignee: Kentec, Inc., Decatur, Ga.

[21] Appl. No.: 549,622

[22] Filed: Dec. 20, 1983

Related U.S. Application Data

[60] Division of Ser. No. 357,425, Mar. 12, 1982, which is a continuation of Ser. No. 169,371, Jul. 16, 1980.

[51] Int. Cl.[4] .............................................. B23P 11/00
[52] U.S. Cl. .................................. 29/432; 29/526 R; 40/152; 227/148; 227/152; 403/401; 411/461; 411/912
[58] Field of Search ................. 29/432, 526 R, 432, 29/432.2; 227/19, 30, 152, 148; 40/152; 403/401, 402; 411/439, 461, 912

[56] References Cited

U.S. PATENT DOCUMENTS

| | | | |
|---|---|---|---|
| 199,579 | 1/1878 | Rose | 227/152 |
| 1,491,673 | 4/1924 | Cockbaine et al. | 411/461 |
| 1,664,687 | 4/1928 | Jensen . | |
| 2,430,322 | 11/1947 | Anstett | 227/148 |
| 2,596,181 | 5/1952 | Soderberg et al. | 411/461 |
| 2,782,673 | 2/1957 | Packard | 411/461 |
| 2,903,699 | 9/1959 | Mazzola | 227/152 X |
| 3,112,105 | 2/1962 | Keller | 227/152 |
| 3,147,484 | 9/1964 | Nelson | 227/148 X |
| 3,266,361 | 8/1966 | Gravenhorst et al. | 40/152 X |
| 3,618,446 | 11/1971 | Black . | |
| 3,734,381 | 5/1973 | Blevio | 227/148 |
| 3,898,906 | 8/1975 | Greenberg | 411/912 X |
| 4,126,259 | 11/1978 | Galer et al. | 227/152 X |
| 4,127,226 | 11/1978 | Jasper | 227/69 |

Primary Examiner—Charlie T. Moon
Attorney, Agent, or Firm—Thomas & Kennedy

[57] ABSTRACT

A right angle clamp assembly holds two frame elements in a common plane and in angled abutment to form a mitered joint. Pneumatic cylinders are arranged to move the movable clamps of the right angle clamp assembly. A fastener tool has its discharge opening positioned on one side of the location where the mitered joint is to be formed, and a brace is positioned on the other side, with the brace being movable toward and away from the location of the mitered joint. The fastener tool is tiltable with respect to the right angle clamp assembly, and control means are provided for firing the fastener tool in response to the frame elements being gripped by the right angle clamp assembly. The fastener is inserted into the mitered joint at an angle formed by the frame elements to draw the mitered joint together.

3 Claims, 8 Drawing Figures

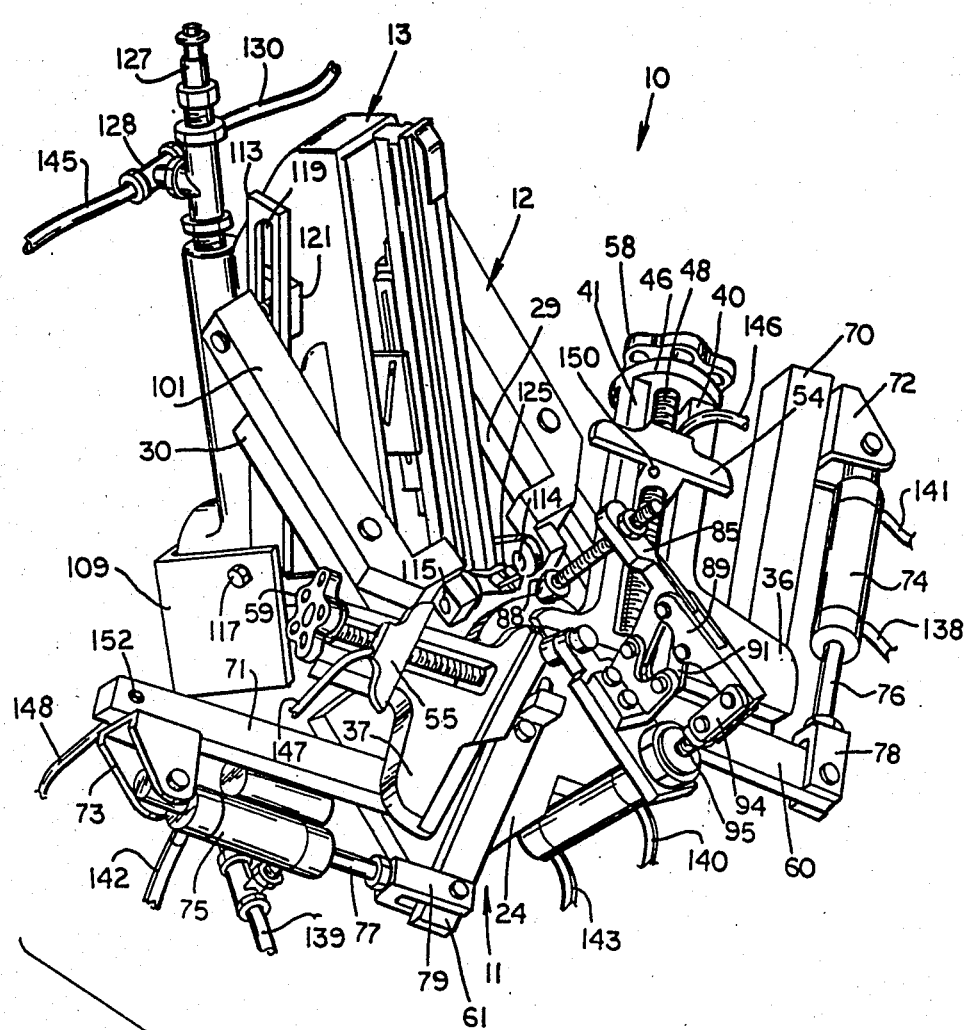
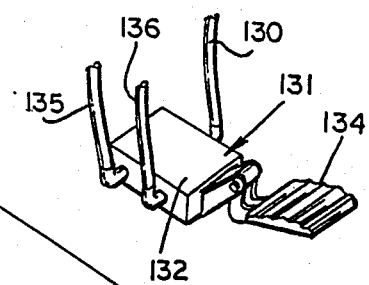
Fig. 1

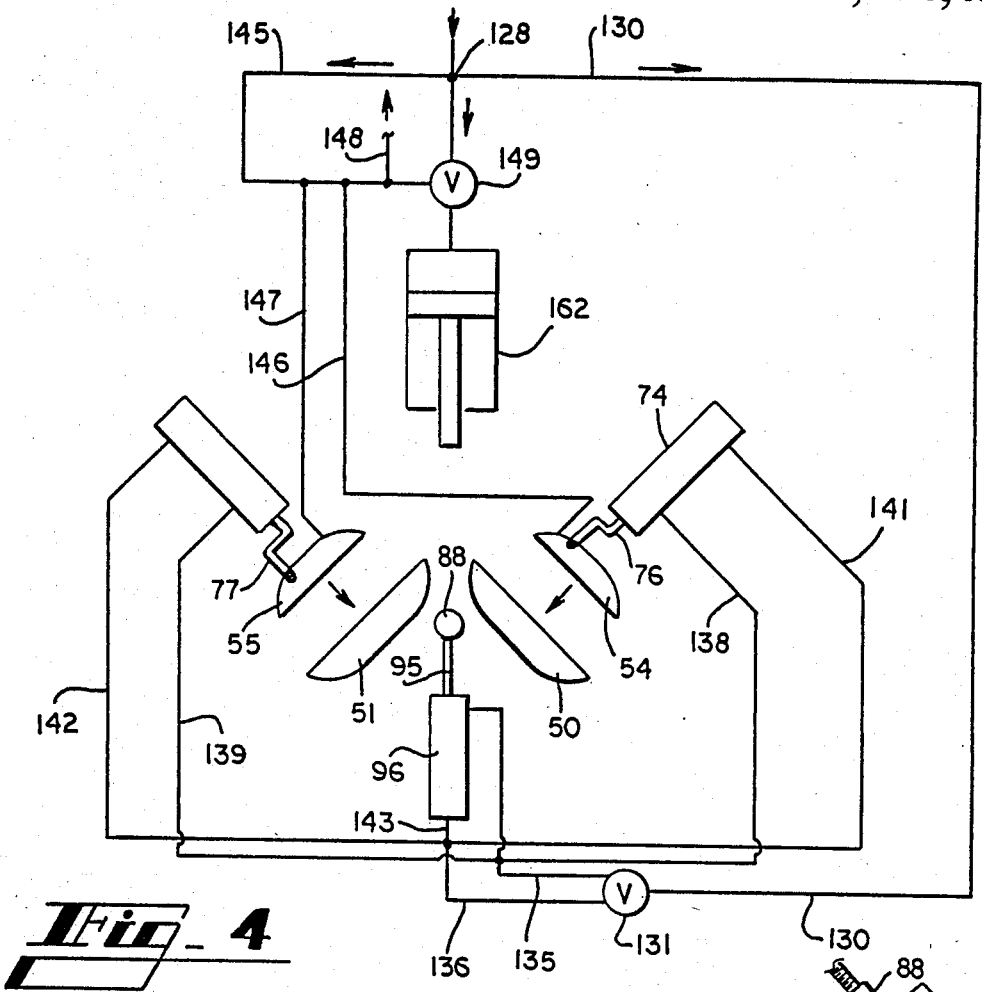
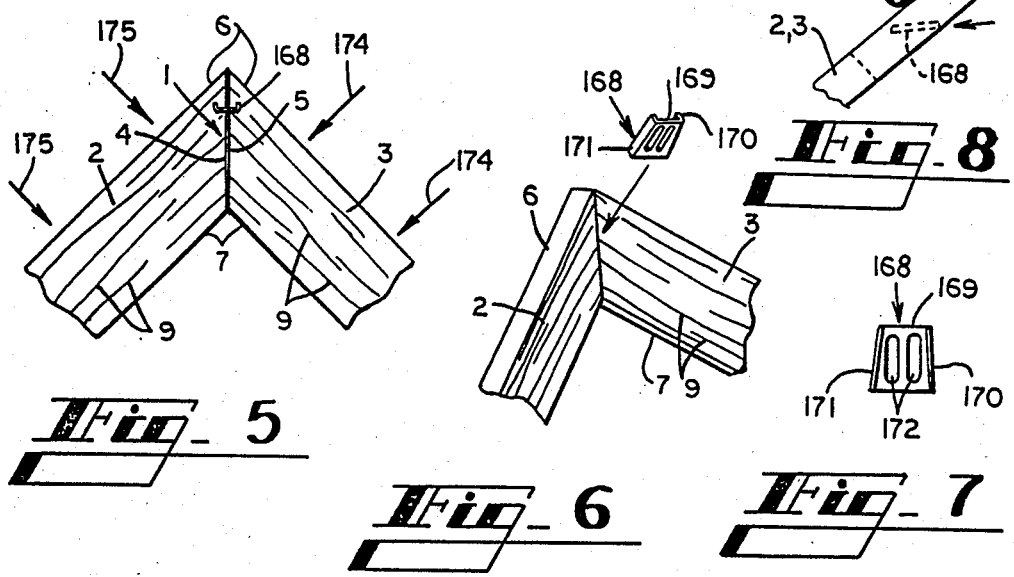

METHOD OF FASTENING METERED JOINTS OF A WOODEN PICTURE FRAME

This application is a division of application Ser. No. 357,425, filed Mar. 12, 1982 which was a continuation of application Ser. No. 169,371 filed July 16, 1980.

BACKGROUND OF THE INVENTION

This invention relates to a method and apparatus for fastening together the frame elements of a picture frame or the like, and to a frame formed by the method and apparatus.

In the production of frames of the type used to mount picture or mirrors and similar objects, and in the production of panel doors for kitchen cabinets and the like and the frames for the door openings, the frame elements usually are formed with end surfaces oriented at 45° angles with respect to the longitudinal axis of the frame elements with the grain of the wood extending along the length of each frame element and the angled end surfaces of each frame elements are matched together with a similar angled end surface of an adjacent frame element to form a 90° mitered joint, and the frame elements are connected together by a fastener.

One process used for fastening mitered joints is to insert at least one nail into the outer edge surface of one frame element through that frame element, through the mitered joint, and into the adjacent frame element. As the fastener is driven through the mitered joint, it tends to compress or draw together the mitered joint. A second fastener can then be driven from the edge surface of the adjacent frame element through the mitered joint, and this usually forms a firm connection between the frame elements. Some disadvantages of this type connection procedure are that the head portions of the fasteners are visible at the edge of the frame when the frame is hung on a wall, or if the fasteners are counter sunk into the frame elements the holes or the putty covering the holes are visible, a multiple number of fasteners are required for each joint to form a stable frame, there is a hazzard that the fasteners will hit each other as they are driven into the frame, and if the frame is held in a jig and fasteners are driven simultaneously through both of the frame elements at the corner of the frame, two fastener tools are required for the process.

Another process for joining frame elements together in a mitered joint is to place the angled end surfaces of the frame elements together to form the mitered joint and then to insert a staple or similar fastener into the back surfaces of the frame elements at a right angle with respect to the surfaces of the frame elements so that the fastener straddles and therefore connects together the frame elements. Since the movement of the fastener into the surfaces of the frame elements usually does not tend to draw the frame elements together, the firmness of the connection between the frame elements depends upon the operator's technique, and if the operator is not diligent in pressing the frame elements together during the fastening procedure, a loose joint is formed.

Another process for joining frame elements together in a mitered joint is to form a kerf in each frame element adjacent the mitered joint on the unexposed surfaces of the joint and extending outwardly from the inside surfaces of the joint and then inserting a clamp into the kerfs. A disadvantage of this process is that it requires additional labor and time, and therefore is expensive.

None of the frame fastening processes known to the inventors provide the advantages of drawing the mitered joint together by the movement of the fastener into the material, using a single fastener, inserting the fastener into the rear or unexposed surface of the mitered joint, and expediently and inexpensively forming and fastening the mitered joint.

SUMMARY OF THE INVENTION

Briefly described, the present invention comprises a frame fastener for connecting together the frame elements of rectangular frames such as picture frame and the like to form mitered joints at the corners of a rectangular frame, wherein the frame elements are placed in and held by a right angle clamp assembly so that the 45° angle end surfaces of the frame elements are held in abutment with each other, and a fastener is inserted into the back or unexposed surfaces of the frame elements. The fastener straddles the joint between the frame elements at an angle from the unexposed surface near the outer corner of the joint and is sloped toward the inside of the right angle formed at the corner of the frame joint.

The right angle clamp assembly includes stationary clamp elements for holding the inside surfaces of the frame elements and movable clamp elements that move toward and away from the inside clamp elements for bearing against the outside edges of the frame elements and urging the frame elements toward the stationary clamp elements and urging the end surfaces of the frame elements into abutment with each other. A brace is movable against the outside surfaces of the frame elements at the joint opposite the surfaces of the frame elements into which the fastener is to be inserted, and the fastener tool is positioned with its discharge opening at the plane where the frame elements are to be located when gripped by the right angle clamp assembly. The movable clamp elements are actuated by pneumatic cylinders, and a pressure responsive switch responds to the gripping by the movable clamp elements of the frame elements to actuate the fastener tool, so that the fastener tool does not discharge a fastener unless the frame elements are properly gripped in the right angle fastener assembly.

The fastener tool is tiltable with respect to the right angle clamp assembly so that the fasteners can be inserted at shallow angles into the frame elements formed from soft wood, or the fastener tool can be tilted to insert the fasteners at a steeper angle into the frame elements formed of harder woods.

Thus, the frame elements are characterized by having their 45° angled end surfaces pressed together in a mitered joint as a fastener is inserted at an angle sloped with respect to the back surfaces of the frame elements toward the inside of the right angle formed by the frame elements, thus tending to draw the joint together.

Therefore, it is an object of this invention to provide a frame fastener for rapidly and accurately connecting together the 45° angle end surfaces of frame elements to form a right angle mitered joint in a frame structure.

Another object of this invention is to provide a frame fastener which forms tight mitered joints in rectangular frame structures, with the fastener for the joints straddling the joints and extending through the back surfaces of the frame elements at an angle sloped toward the inside of the right angle formed by the frame elements.

Another object of this invention is to provide a frame fastener for forming picture frames and the like including a right angle clamp assembly and a cradle for a fastener tool which locates the discharge opening of the fastener tool at the position where the mitered joint is to be formed by the clamp assembly, with the cradle being tiltable so as to tilt the fastener tool about an axis extending approximately through the discharge opening of the fastener tool so as to insert fasteners into straddled relationship about the joint and at variable angles with respect to the surface of the frame.

Another object of this invention is to provide a frame fastener for connecting together the mitered joints of picture frames and the like, wherein the movable clamp elements of a right angle clamp assembly are urged against the frame elements of the picture frame by pneumatic cylinders, and in response thereto, a fastener tool discharges a fastener that penetrates the surfaces of the frame elements at the mitered joint to connect the frame elements together.

Another object of this invention is to provide a method and apparatus for rapidly and reliably connecting together the frame elements of a picture frame or the like in a firm mitered joint so that the fasteners are inserted through the back or unexposed surfaces of the picture frame and the fasteners are not visible when the frame is hung on a wall surface.

Another object of this invention is to provide a sturdy picture frame which has fasteners inserted into the back surface of the frame and which, as they are being inserted, tend to draw the frame elements together in a tight mitered joint.

Another object of this invention is to provide a method of inserting fasteners into the mitered joint of a picture frame or the like wherein the fastener straddles the joint and is inserted from the unexposed surface of the joint at an angle which uses the process of cutting through the wood grain to gather the frame elements tightly together.

Another object of this invention is to provide an improved means for fastening a miter joint of a frame by inserting the fastener into the joint from an unexposed surface of the joint so as to avoid damaging any exposed surfaces of the joint.

Other objects, features and advantages of the present invention will become apparent upon reading the following specification, when taken in conjunction with the accompanying drawings.

BRIEF DESCRIPTION OF DRAWINGS

FIG. 1 is a perspective illustration of the frame fastener.

FIG. 4 is a schematic illustration of the pneumatic control system for the frame fastener.

FIG. 5 is a detail illustration of a mitered joint of a rectangular frame.

FIG. 6 is a perspective illustration of a mitered joint of a rectangular frame, showing the angle at which a fastener is inserted into the mitered joint.

FIG. 7 is a side elevational view of a fastener of the type used in forming the picture frames with the frame fastener of FIGS. 1-4.

FIG. 8 is a detail edge view of the corner of a frame, showing the brace foot and the fastener inserted in the corner of the frame.

DETAILED DESCRIPTION

Figure 2:
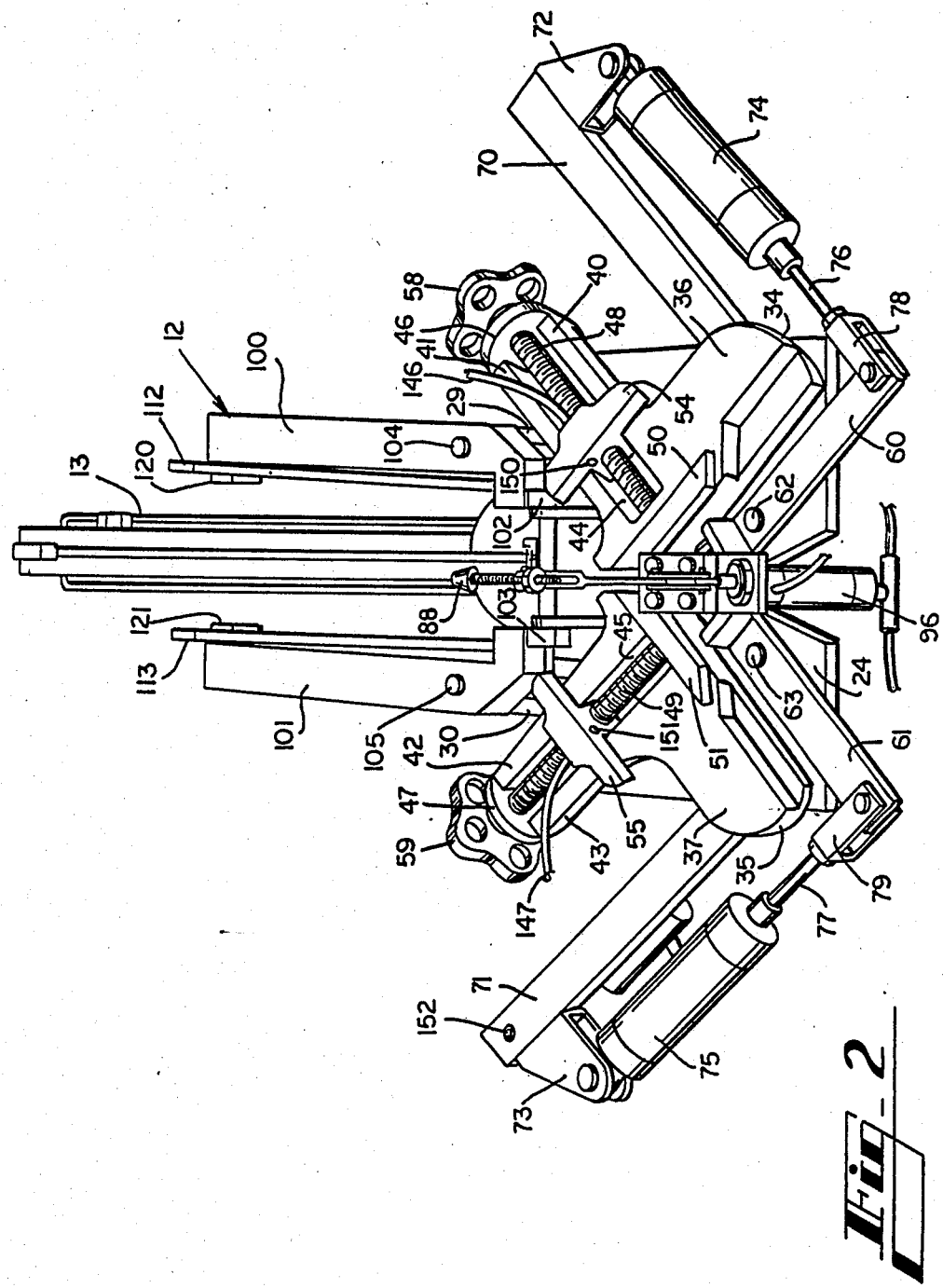
FIG. 2 is a front view of the frame fastener.
Figure 3:
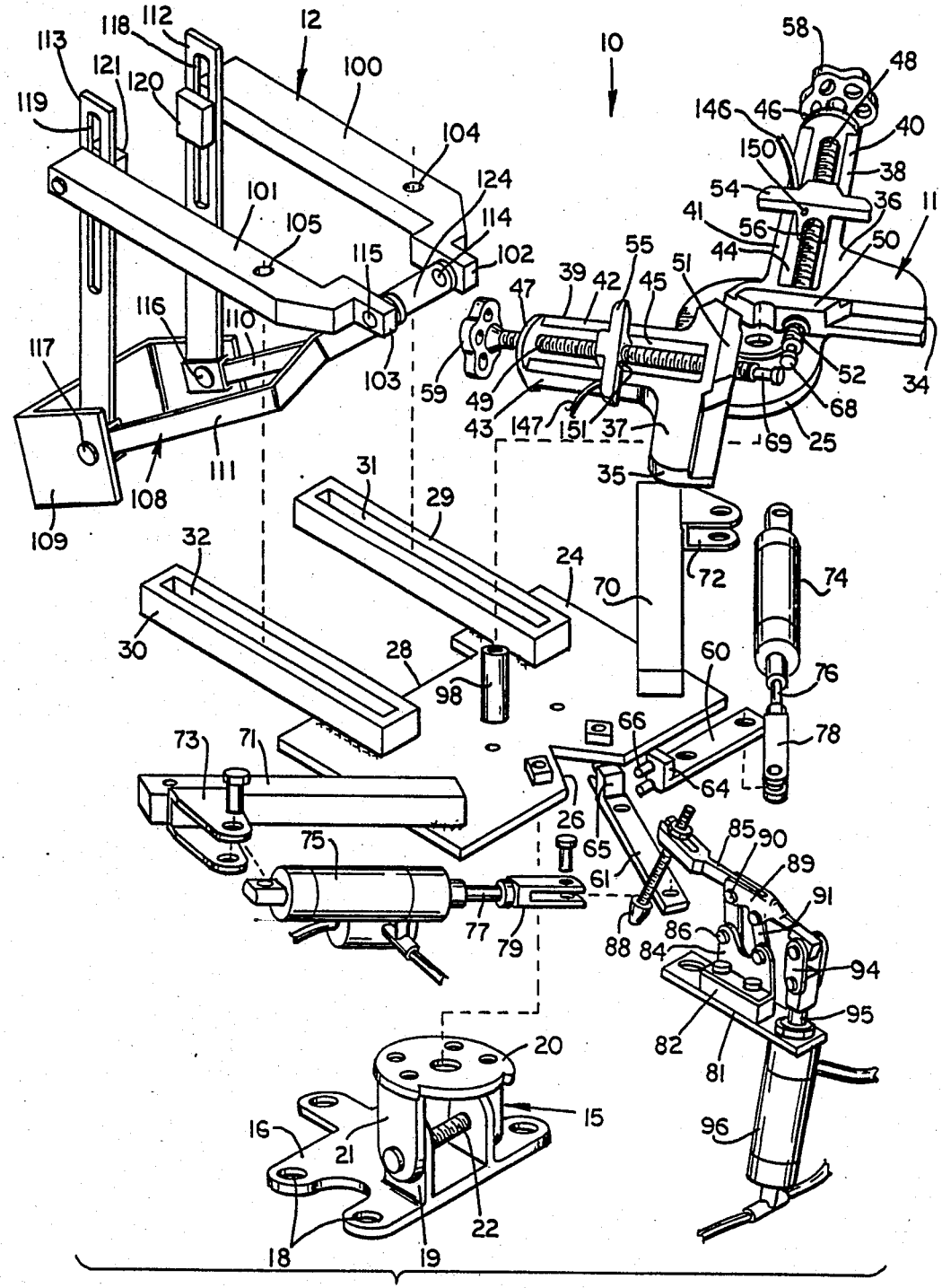
FIG. 3 is an exploded perspective illustration of the frame fastener with the fastener tool removed therefrom.

Referring now in more detail to the drawings, in which like numerals indicate like parts throughout the several views, FIGS. 5 and 6 illustrate a right angle mitered joint 1 of a rectangular frame, such as a picture frame, which includes wooden frame elements 2 and 3 each having 45° end surfaces 4 and 5 in abutment with each other. The frame has four mitered joints and includes an outer peripheral surface 6, an inner edge surface 7, a back or unexposed surface 8 and a front or decorative surface (not shown). The grain of the wood 9 extends along the length of the frame elements 2 and 3.

FIG. 1 illustrates the frame fastener 10 which is used to form the mitered joints of FIGS. 5 and 6 and includes a right angle clamp assembly 11, fastener tool cradle 12 and fastener tool 13. Right angle clamp assembly 11 includes support stand 15 having a base plate 16 defining openings 18 therethrough for rigid connection of a base plate to a work table, and upwardly extending clevis 19. Tiltable support plate 20 includes downwardly projecting clevis 21 which is connected to clevis 19 by means of pivot pin 22 and a set screw.

Mounting plate 24 has its lower surface placed in flat abutment with the upper surface of tiltable support plate 20, and pedestal 25 has its lower surface in flat abutment with the top surface of mounting plate 24. Pedestal 25, mounting plate 24 and tiltable support plate 24 are rigidly connected together by means of bolts or similar fasteners (not shown), so that the mounting plate and pedestal are tiltable with respect to the work table (not shown) on which the frame fastener is mounted.

Mounting plate 24 is approximately rectangular but includes V-shaped notch 26 at its front edge and U-shaped notch 28 at its rear edge. Cradle braces 29 and 30 are rectilinear in shape and are rigidly mounted in spaced parallel relationship with respect to each other in a common plane and are rigidly attached to the upper surface of mounting plate 24, as by welding. Each cradle brace 29 and 30 includes an elongated slot 31, 32, and slots 31, 32 are parallel to each other and oriented vertically.

Right angle clamp assembly 11 includes a pair of work supports 34 and 35 oriented at right angles with respect to each other and which define work surfaces 36 and 37 in a common plane. Work supports 34 and 35 are rigidly mounted to pedestal 25, and each work support 34, 35 includes travel screw extension 38, 39, each of which includes a pair of parallel legs 40, 41, and 42, 43 that extend parallel to one another with the legs 40, 41 extending at a right angle with respect to the legs 42, 43. The parallel legs 40, 41, 42, 43 define travel screw slots 44, 45 respectively, and heads 46, 47 are mounted at the ends of legs 40, 41 and 42, 43. Travel screws 48, 49 extend through openings in heads 46, 47.

A stationary clamp element 50, 51 is formed on each work support 34, 35, with each clamp elements protruding above the work surfaces 36, 37 and in alignment with a travel screw 48, 49. The travel screws 48, 49 extend through openings through the stationery clamp elements 50, 51, such as opening 52, and movable clamp elements 54, 55 are positioned in sliding relationship on parallel legs 40, 41 and 42, 43, with each movable clamp element defining an internally threaded opening therethrough, such as opening 56 of clamp element 54. The external surface of travel screw 48 is formed with a helical thread extending thereabout which engages the threads of openings 56 of each movable clamp element 54, 55, so that when each travel screw is rotated, its movable clamp element 54, 55 moves toward or away from the stationary clamp element 50, 51. The travel screws 48, 49 can be rotated manually by rotating the handles 58 or 59 that are connected to the outer ends of the travel screws.

Clamp lever arms 60, 61 are each pivotally mounted intermediate their ends by pivot pins 62, 63 to mounting plate 24. The clamp lever arms are oriented approximately at a right angle with respect to each other, with their inner ends each including a cleat 64, 65, with each cleat including a pair of protrusions 66. The end portions of the travel screws 48 and 49 that protrude through the stationary clamp elements 50, 51 are undercut at 68, 69, and the protrusions of the cleats 62, 63 straddle the undercut portions 66, 67 of the travel screw. Thus, when the clamp lever arms 60, 61 are pivoted about their pivot pins 62, 63, the travel screws 48, 49 reciprocate along their lengths through the openings 52 of stationary clamp elements 50, 51, thus reciprocating the movable clamp elements 54, 55.

Cylinder support arms 70 and 71 are each rigidly mounted at their inner ends to mounting plate 24 and are oriented at a right angle with respect to each other. Each cylinder support arm 70, 71 includes a clevis 72, 73 at its upper end, and a fluid actuated cylinder 74, 75 is supported by the clevis. The cylinder rod 76, 77 of each cylinder 74, 75 has a connector clevis 78, 79 mounted thereto, and each connector clevis is pivotally mounted to the distal end of a clamp lever arm 60, 61. The cylinders 74, 75 are double acting cylinders and function to oscillate the clamp lever arms 60, 61 about their pivot pins 62, 63, to reciprocate the travel screws and to move the movable clamp elements 54, 55 toward or away from the stationary clamp elements 50, 51.

Frame brace assembly 80 includes mounting strap 81, built-up platform 82 postioned on mounting strap 81 and double clevis 84 supported on built up platform 82. Right angled brace arm 85 has one of its ends pivotally mounted in double clevis 84 on pivot pin 86, and the other end of angled brace arm 85 supports brace foot 88. Pivot arm 89 is connected at one of its ends to pivot pin 90 and pivot pin 90 extends through angled brace arm 85 intermediate its ends. Connector link is connected at one of its ends to the other pivot pin 92 of the double clevis 94 and is connected at its other end to pivot arm 89 intermediate its ends. The distal end of pivot arm 89 is connected by means of swivel 94 to cylinder rod 95. Cylinder rod 95 extends through mounting strap 81 and into pneumatic cylinder 96. Pneumatic cylinder 96 is a double-acting cylinder, and when it receiprocates its cylinder rod 95, pivot arm 89 rocks about connector link 91 so as to oscillate angled brace arm 85, thus moving the brace foot 88 in an arc toward and away from the plane of work surfaces 36, 37 of right angle clamp assembly 11. Mounting socket 98 is rigidly connected at one of its ends to mounting plate 24, and the mounting strap 81 of frame brace assembly 80 is rigidly mounted to the mounting socket by means of a bolt or other fastener and the pneumatic cylinder 96 is located in the V-shaped notch 26 of mounting plate 24.

Fastener tool cradle 12 comprises parallel support arms 100, 101 that are angled inwardly at their lower ends 102, 103. Fastener openings 104, 105 extend through the support arms 100, 101, and fasteners such as bolts extend through the openings 104, 105 and through the slots 31, 32 of the cradle braces 29, 30, so that the support arms 100, 101 rest in flat abutment on cradle braces 29, 30, and can be repositioned along the cradle braces, as necessary.

Cradle yoke 108 includes base 109, side legs 110 and 111 and slide bars 112 and 113. Side legs 110 and 111 are each pivotally connected to the lower ends 102 and 103 of support arms 100 and 101 by pivot pins 114 and 115, slide straps 112 and 113 are pivotally connected at their lower ends to base 109 by pivot pins 116 and 117, and the upper end portions of slide straps 112 and 113 define adjustable slot openings 118 and 119. Bolts 120 and 121 extend through the slots 118 and 119 and into the distal ends of support arms 100 and 101, and releasably connect the slide straps 112 and 113 to the support arms 100 and 101. Thus, the attitude of the cradle yoke 108 with respect to support 100 and 101 can be adjusted by loosening bolts 120 and 121 and sliding the slide straps 112 and 113 about the bolts and then tightening the bolts.

The upper portions of side legs 110 and 111 are received in the U-shaped slot 28 of mounting plate 24.

Support bracket 124 is located between the upper ends of side legs and 110 and 111 of cradle yoke 108, and rigidly connects the upper end portions of the side legs together. Fastener tool 13 rests in and is mounted to fastener tool cradle 12 by placing the head portion of the fastener tool in the cradle yoke 108 with the discharge opening 125 of the fastener tool located between the pivot pins 114 and 115. The fastener tool usually is rigidly connected in the fastener tool cradle 12 by bolts extending through the support bracket 124 into the tool and by bolts extending through base 109 into the tool.

The arrangement is such that the discharge opening 125 of fastener tool 13 is placed immediately below the plane of work surfaces 36, 37 in the space adjacent the intersection of the work surfaces. It will be noted that if the fastener tool 13 is tilted with respect to the plane of the work surfaces 36, 37, by adjusting slide straps 112 and 113 with respect to support arms 100 and 101, the cradle yoke 108 pivots about the pivot pins 114 and 115, and the axis rotation of the pivot pins 114 and 115 extends approximately through the discharge opening 125 of the fastener tool. Thus, the fastener tool can be pivoted substantially without moving discharge opening 125 with respect to the plane of the work surfaces 36, 37.

Additionally, if the cradle yoke and fastener tool are moved closer to or further away from the right angle clamp assembly 11, by loosening the bolts through openings 104 and 105 of support arms 100 and 101 and through the slots 31 and 32 of cradle braces 29 and 30 and sliding the support arms 100 and 101 with respect to the cradle braces, the discharge opening 125 moves in a plane parallel to the plane of the work surfaces 36 and 37 since the cradle braces 29 and 30 and support arms 100 and 101 extend parallel to the plane of the work surfaces 36, 37.

Air under pressure is supplied to frame fastener 10 through a conduit from a compressor (not shown) connected to fitting 127, with the air communicating directly with the plenum (not shown) within fastener tool 13. The T-connector 128 communicates with fitting 127 and with air supply conduit 130 so as to supply the pressurized air to one side of foot control valve 131. Foot control valve is located on the floor at the operator's position adjacent frame fastener 10 and includes valve housing 132 and pedal 134 pivotally mounted to the housing 132. The valve spool (not shown) is positioned within valve housing 132 and controls the supply of air pressure from air supply conduit 130 to air control conduits 135, 136.

As illustrated in FIG. 4, air conduit 135 communicates with branch conduits 138, 139 and 140, and these conduits each communicate with one end of a pneumatic cylinder 74, 75 and 96, so that when pressure is received in a branch conduit 138-140, each cylinder retracts its cylinder rod 76, 77 and 95. This tends to close the movable clamp elements 54 and 55 toward the stationary clamp elements 50 and 51 and to move the brace foot 88 toward the plane of work surfaces 36 and 37 of the right angle clamp assembly 11. When the pedal of valve 131 is raised, air under pressure is supplied from air supply conduit 130 to the other air controlled conduit 136, through branch conduits 141, 142 and 143, thus reversing the pressure exerted on pneumatic cylinders 74, 75 and 96, distending their cylinder rods 76, 77 and 95, thus causing movable clamp elements 54 and 55 to move away from stationary clamp elements 50 and 51 and causing brace foot 88 to pivot away from the plane work surfaces 36 and 37.

T-connector 128 is also connected to air supply conduit 145, and air supply conduit 145 is connected to branch conduits 146, 147 and 148, and air supply conduit is also connected to control valve 149. Branch conduits 146 and 147 each communicate through an opening 150 and 151 formed through movable clamp elements 54 and 55, respectively, while branch conduit 148 is connected to one end of air opening 152 formed through cylinder support arm 71. The arrangement is such that the air under pressure moving through air supply conduit 145 communicates with control valve 149, but the air is also continuously bled to the atmosphere through conduits 146, 147 and 148.

When the operator depresses foot pedal 134 and pneumatic cylinders 74 and 75 function to move movable clamp elements 54 and 55 into clamping relationship with respect to a frame element such as frame elements 160 and 161, the openings through movable clamp elements 54 and 55 are blocked by the frame elements so that the flow of air through branch conduits 146 and 147 is substantially retarded, thus permitting a build up of air pressure in control valve 149. However, air is still bled to the atmosphere through branch conduit 148 and air opening 152 in cylinder support arm 71. If the operator covers the air opening 152 with his fingers, air pressure is the built up in control valve 149 to a pressure sufficient to actuate the control valve 149, causing a supply of air to be fed to the cylinder 162 of fastener tool 13, whereupon the fastener tool discharges a fastener from its discharge opening 125.

As illustrated in FIGS. 5 and 6, the frame elements 2 and 3 are rectilinear elements each having their end portins 4 and 5 formed at a 45° angle, and the angled end portions are placed in abutment with each other, causing the frame elements to form a 90° angle with respect to each other. This forms a 90° mitered joint, and a fastener, such as fastener 168, is inserted into the joint by fastener tool 13. The particular fastener 168 illustrated herein is approximately U-shaped in cross-section and is of a breadth sufficient to straddle the joint formed between the rectilinear frame elements. Fastener 168 includes central web 169 and side flangess 170 and 171, with openings 172 formed in central webb 169. The fastener is inserted into the back surface of the frame elements, from beneath the frame as the fastener is discharged from the discharge opening of the fastener tool 13, with one flange 170 located on one side of the seam of the joint and with the other flange 171 on the other side of the seam of the joint. The fastener 168 is inserted at an inclined angle with respect to the back surfaces of the frame elements so that it is inclined toward the inside of the right angle formed by the frame elements.

When the movable clamp elements 54 and 55 are moved under the influence of pneumatic cylinders 74 and 75 to clamp the frame elements 2 and 3 against the stationary clamp elements 50 and 51, the forces applied to the edge surfaces of the frame elements 2 and 3 are illustrated by the arrows 174 and 175 (FIG. 5). The forces tend to urge the 45° angle end surfaces 4 and 5 toward each other so that a firm abutment of the angled end surfaces will be present when the frame elements are securely clamped in the right angle clamp assembly 11, just prior to the insertion of a fastener 168 into the mitered joint. In addition, the brace foot 88 also pivots toward the mitered joint so that the surfaces of the joint are further urged toward a common plane and the frame elements are braced against the impact of the fastener 168 as the fastener enters the frame elements. Since the flanges 170 and 171 of the fastener (FIG. 7) are tapered, and since the fasteners 168 are inserted at an angle sloped toward the inside of the right angle formed by the frame elements (FIG. 8), the flanges 170 and 171 tend to be deflected apart from each other as they engage the grain 9 of the wood, thereby tending to draw the grain together. Therefore the frame elements are drawn together as the fastener enters the material of the frame elements, thus assuring firm abutment of the frame elements.

While this invention has been described in detail with particular reference to preferred embodiments thereof, it will be understood that variations and modifications can be effected within the spirit and scope of the invention as described hereinbefore and as defined in the appended claims.

We claim:

1. A method of fastening mitered joints of picture frames of the like having elongated wooden frame elements with the grain of the wood extending along the length of the frame elements and with the frame elements having angled end surfaces, comprising the steps of positioning frame elements in angled relationship with respect to each other with their end surfaces in flat abutment with each other and forming a plurality of mitered joints with the grain of each frame element generally oriented at an angle with respect to the grain of adjacent frame elements to form a closed frame having a front surface, a back surface, and inner and outer edge surfaces, and as the frame elements are positioned in abutment with each other, clamping adjacent frame elements in their angled relationship and inserting a fastener into the clamped frame elements about the mitered joint through the previously uncut grain of the frame elements, the fastener having a central web and side flanges along opposite sides of the central web with the side flanges straddling the end surfaces of the frame elements, and wherein the step of inserting the fastener into the frame elements comprises orienting the central web and side flanges of the fastener at an angle sloped from the back and outer edge surfaces of the frame toward the front and inner surfaces of the frame and as the fastener is inserted cutting across the wood grain with the side flanges of the fastener and tending to gather the wood grain with the side flanges as the fastener is inserted into the frame elements.

2. A method of forming picture frames and the like comprising assembling elongated wooden frame elements in a common plane with each frame element having generally parallel grain extending along the length of the frame element and each frame element having angled end surfaces with the frame elements being assembled with their angled end surfaces in abutment with the angled end surfaces of adjacent frame elements and forming mitered joints about the frame, with the frame formed by the frame elements having a front surface, a back surface, an outer edge surface and an inner edge surface, inserting fasteners in the frame through the previously uncut grain of the frame elements with the fasteners being approximately U-shaped in cross-section and including a flat central web and side flanges extending along opposite edges of the central web at angles with respect to the central web and said side flanges of each fastener straddling the joint of the abutting frame elements, with the central web of each fastener being inserted through the back surface of the frame and sloped with respect to the frame from adjacent the back surface and the outer edge surface at a joint of the frame toward the front surface and the inner edge surface at the joint of the frame, and as the fasteners are inserted in the frame cutting with the side flanges of the fasteners across the grain of the frame elements and urging the end surfaces of the frame elements together in response to the cutting by the side flanges of the fasteners of the grain of the frame elements.

3. A method of forming picture frames and the like with elongated frame elements with each frame element being formed of wood with the grain of the wood extending along the length of the frame element and each frame element having angled end surfaces in abutment with the angled end surfaces of adjacent frame elements and forming mitered joints at the corners of the frame, with the frame including opposed back and front surfaces and opposed outer and inner edge surfaces, the method comprising progressively assembling the frame elements in a common plane with their angled end surfaces in flat abutment with an adjacent frame element, and as the frame elements are assembled inserting fasteners in the mitered joints with the fasteners being approximately U-shaped in cross-section with a flat central web and flanges extending along the side edges of the central web and disposed at an angle from said central web, the step of inserting the fasteners comprising inserting each fastener through the back surface of the frame at a mitered joint with side flanges of the fastener straddling the joint and the central web extending at an angle sloped from adjacent the back surface and the outer edge surface toward the front surface and the inner edge surface of the frame, and as the fasteners are inserted in the frame cutting with the side flanges of the fasteners across the previously uncut grain of the frame elements generally in a direction from adjacent the outer edge surface of a corner toward the inner edge surface of a corner of the frame and urging the grain toward the joint in response to cutting across the grain.

* * * * *